J. A. CAMERON.
MOVING PICTURE MACHINE.
APPLICATION FILED SEPT. 24, 1912. RENEWED JUNE 8, 1918.

1,273,328.

Patented July 23, 1918.
4 SHEETS—SHEET 1.

UNITED STATES PATENT OFFICE.

JAMES A. CAMERON, OF BROOKLYN, NEW YORK, ASSIGNOR TO CAMERON PICTURE MACHINE CO., A CORPORATION OF NEW YORK.

MOVING-PICTURE MACHINE.

1,273,328.   Specification of Letters Patent.   Patented July 23, 1918.

Application filed September 24, 1912, Serial No. 722,009. Renewed June 8, 1918. Serial No. 239,046.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines, of which the following is a specification.

In moving picture machines the general operation both in cameras and in projectors is to intermittently advance the film past a point of exposure or "exposure opening" as it is called. For the purpose of securing uniformity in the action of the film advancing means, to smooth out wrinkles in the film and to hold the film steady while it is being exposed, the film is preferably held under tension at the exposure opening, in a tension device of some sort. This tension device may be either constant or intermittent in its action and in either event the best practice is to have the intermittent film advancing means act on the film while it is still held in the grip of the tension device, for by so doing the film is held under control at all times. The tension device by thus acting in opposition to the film advancing means serves to "retard" the advancing movement of the film. The film advancing means has a relatively quick action so as to feed the film past the exposure opening at a comparatively high rate of speed and by reason of this rapid movement, a certain "momentum" is imparted to the film which, if it is not properly checked by the tension device, is liable to permit the film to feed too far. The tension device thus bears a direct relation to the film advancing means, so that, if the tension exerted by the tension device is equal each time, then the film advancing means will advance an equal amount of film each time. If all films, or all sections of films, were alike in character it would be comparatively easy to provide a tension device which would exert a constant even tension upon the film, but different films and even different sections of the same film vary in character, some of them being rather slippery while others offer more resistance to movement, fresh films in particular being quite sticky. The tension devices in use at the present time have been designed to always exert a predetermined tension upon the film and this regardless of the actual surface conditions of the film. Thus with the present type of tension device, when a piece of film is being handled which offers a moderate degree of resistance, the tension exerted upon the film may be just sufficient to overcome any momentum in the film, so that the film advancing means may act to advance an equal amount of film each time. But if a more or less "sticky" piece of film offering more than the usual frictional resistance is encountered, or if there are lumps or obstructions on the face of the film, then the tension will become greater and consequently the film advancing means may fail to advance a sufficient amount of film each time. In handling sticky films the present tension devices scrape off more or less of the sticky emulsion and this, as it accumulates in the tension device, increases the tension still further thereby further interfering with the proper operation of the film advancing means.

Having outlined the difficulties encountered with existing tension devices, I would state that one object of my invention is to overcome these various difficulties and objections and to provide a tension device which will automatically compensate for the irregularities in the surface of the film so as to exert a substantially uniform tension upon the film, regardless of surface conditions. By thus compensating for surface irregularities and keeping a constant tension on the film, the load upon the film advancing means is maintained substantially constant so that the amount of film advanced by it each time will be substantially equal.

The precise construction of my improved tension device may vary quite widely, but the same consists in general of a plurality of longitudinally arranged clamping shoes arranged to bear upon the edge portions of the film adjacent the exposure opening, which shoes are supported so as to yield freely at any point in the length thereof, together with means for forcing the shoes with a yielding pressure toward the film. In the preferred construction the clamping shoes are arranged in two sets, one set at each side of the exposure opening, and each set consists of two or more independently movable clamping members. A preferred method of mounting the clamping shoes is to support them at points intermediate the ends thereof so that they may freely rock upon such centers of support and to cause the tension means to bear upon the shoes at points intermediate the ends thereof whereby the shoes may readily yield at any point in the length of the same so as to accommodate themselves automatically to the irregularities and varying degrees of frictional resistance in the surface of the film.

Another feature of my invention resides in an improved type of beater for intermittently advancing the film. Beaters heretofore constructed, whether of the rotary or of the oscillatory type, have acted by reason of their arcuate swinging movement about their centers of support, during and at the time of advancing the film, to deflect the film more or less from its true path.

This deflection of the film out of its true path imparts additional resistance to the movement of the film and is therefore a further source of inequality in film movement. A feature of this invention consists in so designing and constructing the beater that it will, while advancing the film, move the film forwardly in a direct path without substantially deflecting the same laterally from such direct path. This feature has a direct bearing on the tension device. By my improved construction the tension device exerts a substantially uniform tension on the film. The beater in furtherance of this idea of maintaining a uniform tension, by advancing the film substantially without deflection, adds no further resistance and therefore serves to assist in maintaining the uniformity of tension exerted on the film by the tension device. The uniformity of tension thus maintained by the coöperative action of the tension device and beater insures an equal amount of film being advanced by the beater at each stroke. In combination with the beater there is preferably provided means for guiding the film in a predetermined path, and the beater is so arranged that it will advance the film in a continuation of the same path.

The film is advanced in the present machine by the coöperative action of the beater and a take-up device, which winds in the film and holds the film to prevent retrograde movement of the same while the beater is acting. This take-up device in the present instance takes the form of a film-engaging sprocket. A special feature of my invention consists in placing this take-up sprocket relatively close to the beater and without any intervening mechanism. This materially shortens the length of film between the tension device and the sprocket thereby further reducing the chance of irregularities in handling the film. Also the take-up sprocket is preferably so mounted that it may be adjusted toward and from the beater for the purpose of "framing" the film with respect to the exposure opening.

Various other features of the invention will appear as the specification proceeds.

In the drawings accompanying this specification I have shown preferred embodiments of my invention but I would have it understood that various changes and modifications may be made therein without departing from the legitimate and intended scope of the invention.

In the drawings:

Fig. 2 is a plan view of the tension device, this view being taken substantially on the line 5—5 of Fig. 1.

Fig. 3 is an enlarged detail view illustrating the operation of the clamping shoes of the tension device.

Fig. 4 is an outside elevation of the clamping gate which forms a part of the tension device.

Fig. 5 is an edge view of the same.

Fig. 6 is a detail end elevation of the film-advancing beater.

Like reference characters refer to corresponding parts throughout the several views.

The numeral 30 designates the frame of the machine, upon which the various parts are mounted. This frame as best shown in Fig. 2, is preferably made in the form of an angular casing which incloses the various working parts, access being had to such parts by means of an angular-sided door 31, hinged at 32 to the side wall of the casing.

The unused portion of the film 33 is supported in any suitable fashion, such support in the present instance being in the shape of a reel inclosed within the housing 34 which is secured upon the top of the frame 30. The exhibited or used portion of the film is here taken care of by being wound up on a reel inclosed within the housing 35 which housing and inclosed reel is supported on a bracket 36 dependent from the stand 37 on which the machine is mounted.

Figure 1:
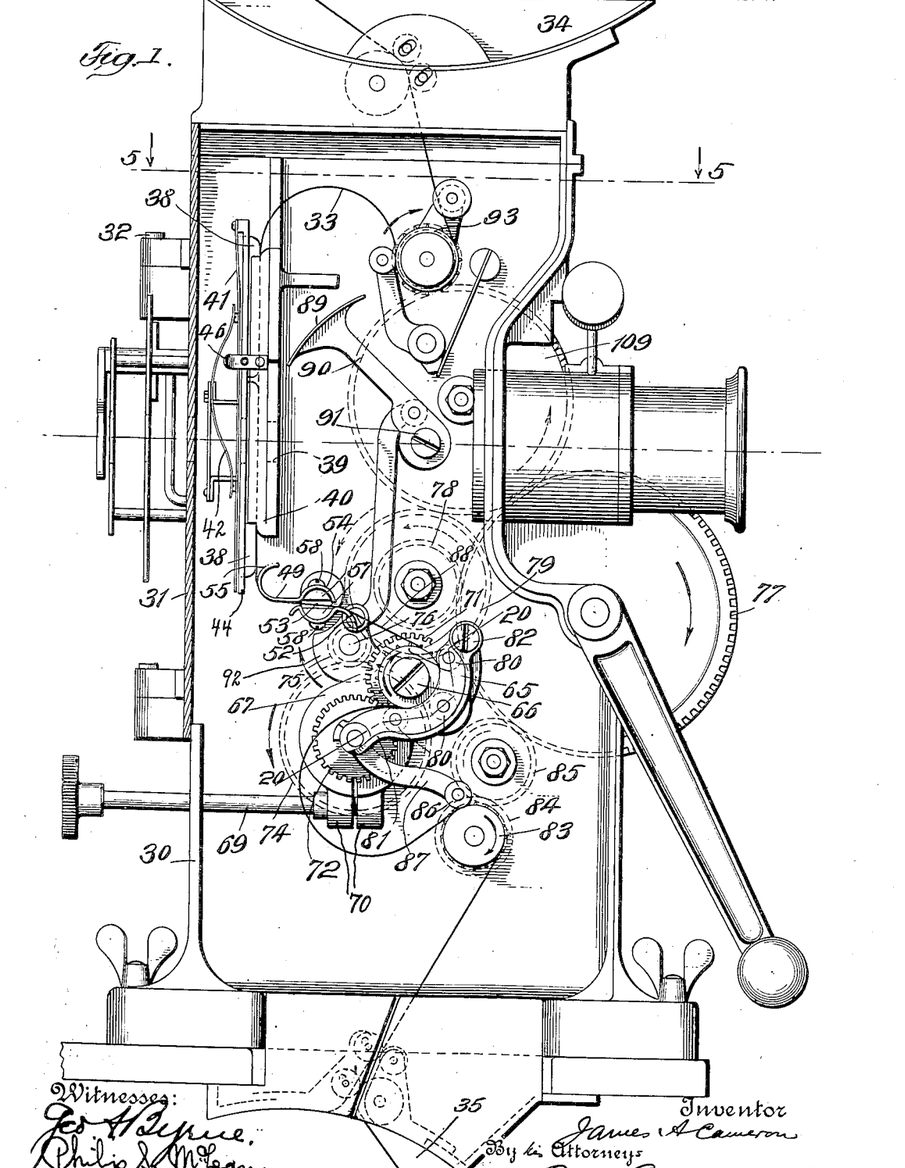
Figure 1 is an enlarged view looking at the opposite side of the machine, the hinged door appearing in section.
Figure 7:
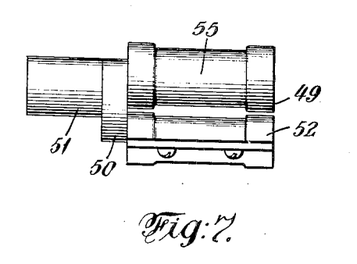
Fig. 7 is an other detail view looking in the direction of arrow 11 in Fig. 6.

Taking up first the consideration of the tension or "retarding" device, the same consists preferably of a series of longitudinally alined shoes 38 which are disposed to engage the edge portions of the film at opposite sides of the exposure opening 39. These shoes clamp the film against a backing 40 and this backing is here the member in which the exposure opening is formed and serves as a support over the face of which the film passes. In order that the clamping shoes may accommodate themselves to varying inequalities in the surface of the film, they are so mounted that they may yield at any point in their length. For this reason they are preferably supported at a point intermediate their ends and are pressed toward the backing with a yielding pressure. This feature is best illustrated in Figs. 1, 4 and 5 wherein the clamping shoes are shown as suspended by flexible hanger straps 41, and acted upon by the ends of the double-ended flexible springs 42. The shoes are secured to the supporting straps by screws 43 or other fastenings, so located at points intermediate the ends of the shoes as to permit the shoes to rock about such centers of support. The yielding pressure may be imparted to the shoes by causing the ends of the springs to bear upon the heads of these fastenings, as shown. The tension device is preferably made so that it may be readily opened up to permit the insertion of the film and this is accomplished in a preferred form by supporting the pressure bars or shoes on a gate 44, which, being hinged at 45, may be swung to carry the tension means to operative or inoperative position. This gate may be caused to exert either a continuous or an intermittent tension on the film. In the present instance it is intended that the gate shall exert a continuous tension on the film. A spring catch 46, or like fastening device is here provided for securing the gate in its closed operative position.

In order that the operation of my improved tension device may be fully understood, it may be well to first explain the operation of the tension devices in present use. The usual tension device consists of a single long pressure bar disposed one at each side of the exposure opening and pressed against the film by spiral or other springs bearing upon opposite ends of the bar. If the surface of the film is uniform, and even in character, a tension device of this sort will exert a practically constant tension upon the film. If, however, the surface is uneven, say by reason of a clot of emulsion on the face of the film, when this inequality reaches the foremost end of the pressure bar, it will force this end of the bar back, against the tension of the spring at that end of the bar, and will, as the film moves down, wedge the pressure bar farther out until at an intermediate point it forces both the tension springs out. The result of this is that the actual tension on the film increases from the time the obstruction enters beneath the pressure bar and places the spring at the entering end under greater tension, up to the point where the both springs are placed under greater tension. With my improvement when an obstruction enters beneath the front end of the foremost one of the clamping shoes it merely serves to rock or tilt the shoe about the center from which it is supported. And since the pressure is applied at this intermediate point of support, the rocking of the shoe does not affect the tension on the film. When the obstruction passes under the point at which the pressure is applied, the spring bearing at this point may be forced to yield somewhat, but the spring is made of sufficient flexibility and length to allow of this yielding movement without varying the tension to any sensible extent. And by breaking up the clamping device into a series of shoes in place of the one long pressure bar heretofore used, any possible inequalities are so broken up and distributed as not to vary to any appreciable extent the general uniformity of tension exerted upon the film. This has the further advantage that while the one shoe may be acting upon an irregular piece of film the other clamping shoes will be unaffected and will continue to exert their own proper tension upon the film regardless of the action of the first clamping shoe. It will thus be clear from the foregoing explanation, that the tension device will exert a substantially even and uniform tension upon the film regardless of various inequalities in the surface of the film. The tension of the pressure springs is preferably sufficient to cause the clamping shoes to iron out any wrinkles there may be in the film.

To further preserve the uniformity of tension exerted by the tension device, provision is preferably made to prevent the emulsion which may possibly be scraped from a sticky or "fresh" film from adhering to the clamping shoes and thereby increasing the tension on the film. This is done in the present instance by grooving the contact face of the clamping shoes, as best shown at 47 in Figs. 2 and 3. By this construction, any loose emulsion or other foreign material coming in contatct with the clamping shoes, is carried on into these grooves in the face of the shoes where it can have no injurious effect. The side edges of the film are preferably guided during passage past the exposure opening by coming into contact with the guiding surfaces 48 on the face of the support 40.

Taking up now the means for intermittently advancing the film, the same consists in the present instance of a take-up device which is adapted to take up a predetermined amount of film once to each cycle of the machine, and a pivoted beater which acts upon the film to intermittently advance a picture-length of film past the exposure opening. The beater is shown located below the tension device and is constructed and arranged to advance the film in a path forming a continuation of the path in which it is guided by the tension device. Specifically it consists of a film-engaging plate 49, carried by the support 50 on the end of the oscillating shaft 51. Coöperating with this upper film-engaging plate there is preferably a lower plate 52 extending rearwardly from the point of support, the film being passed between the two plates in the manner illustrated in Fig. 1. The means by which the beater is caused to advance the film in a direct path without deflecting it from such path, here consists in making the beater of a particular conformation and in placing the center 53, corresponding to the center of support for the blades, eccentric with respect to the center 54 of the supporting shaft, which latter center corresponds to and forms the center of oscillation. This eccentricity existing between the centers of support and oscillation is best illustrated in Figs. 1, 6, 7 and 10. The operation will be understood from this latter figure, wherein it will be clear that during the active downward stroke of the beater, the eccentric mounting will cause the beater to have a bodily sidewise sweeping movement rearwardly and in the direction of advancing movement of the film. The outward active end 55 of the beater is of such a curvature and is so designed that it will, during this bodily movement of the beater, carry the film in substantially the same direct path. This line of advancement represented by the line 56, corresponds to and in fact forms a substantial continuation of the path in which the film is guided by the retarding or tension device, as will be clear from Fig. 1. The beater therefore by thus advancing the film in substantially the same path in which it is previously guided, imparts no further resistance, by bending or otherwise, to the film, and hence actually serves to assist in maintaining the same uniformity of tension exerted by the tension device. It will further be seen that upon the down stroke of the beater the lower rearwardly-extending blade of the beater acts as a fulcrum to support the film at that point, while the active forwardly-extending blade is pulling down on the film to advance the same past the exposure opening. At the same time that the lower rear blade is serving as a fulcrum, it is also, by reason of the eccentric bodily movement of the beater, shifting over laterally in the same direction of movement with the film. So that at the same time the beater is drawing on the film to advance the same, it is also moving along bodily with the film. There is thus comparatively slight relative movement between the beater and the film which it is advancing, so that the friction of the film in passing through the beater is reduced to a minimum and the objectionable "crawl"—which this relative movement between the beater and film has been termed—is practically eliminated.

Figure 8:
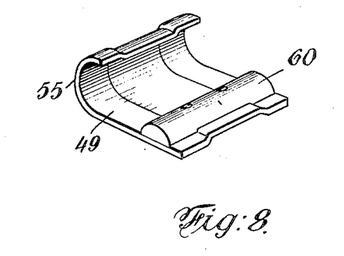
Fig. 8 is a detached detail view of the upper film-engaging plate of the beater.

The film-engaging plates may be made integral with the oscillating support which carries them, and if not made integral may be secured in place in various ways. In Fig. 1 for instance they are secured to the spaced supporting members 57 carried by the oscillating support, by having their inner ends shaped to fit around such supporting members and secured thereto by fastening screws 58. A reverse construction is employed in Figs. 9 to 13, wherein the film-engaging blades are shaped to fit the inside of the somewhat curved supporting members 59, while in Figs. 6, 7 and 8, instead of shaping the blades to fit the curved supporting members 59, filler pieces 60 are attached to the blades which are shaped to fit the curved supporting members.

Figure 9:
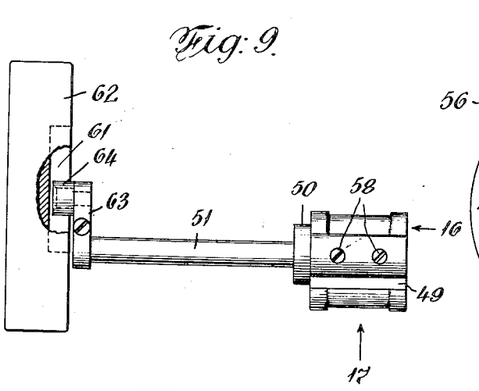
Fig. 9 is a more or less detached view looking down on the beater and the cam for operating the same.
Figure 10:
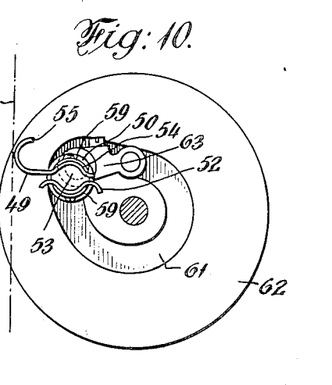
Fig. 10 is another view of these parts looking in the direction of the arrow 16 in Fig. 9.
Figure 11:
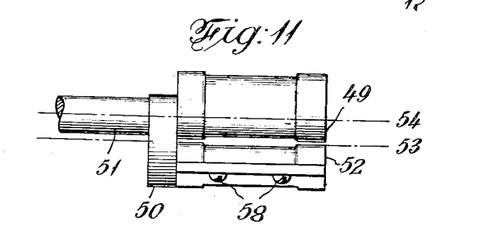
Fig. 11 is an enlarged detail view of the beater looking in the direction of arrow 17 in Fig. 9.
Figure 12:
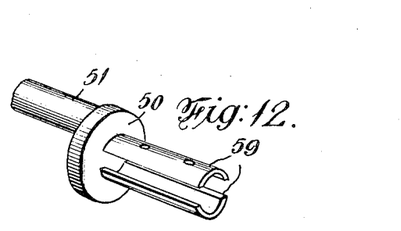
Figs. 12 and 13 are detached detail views of the oscillating support and the upper beater arm of the beater.
Figure 13:
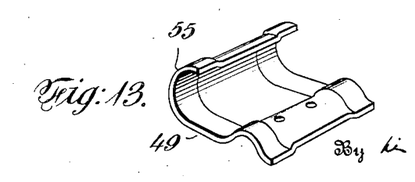
Figure 14:
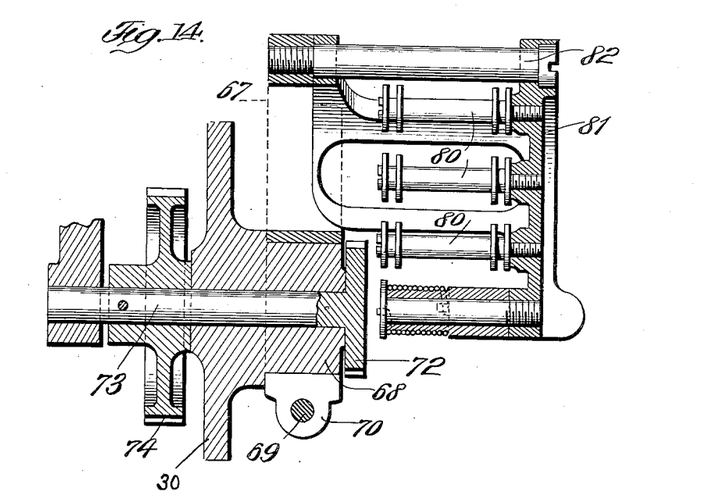
Fig. 14 is a detail sectional view illustrating the manner in which the arm which carries the adjustable take-up sprocket is pivotally supported. This view is taken substantially on the line 20—20 of Fig. 1.
Figure 15:
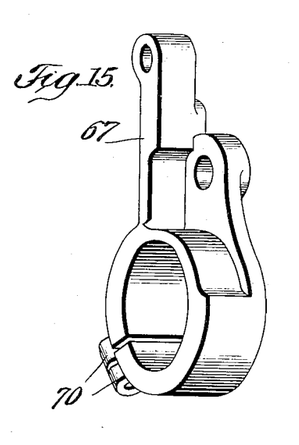
Figs. 15 and 16 are detail views of the swinging arm which carries the take-up sprocket and the support for the guard rolls of the sprocket.
Figures 16, 17:
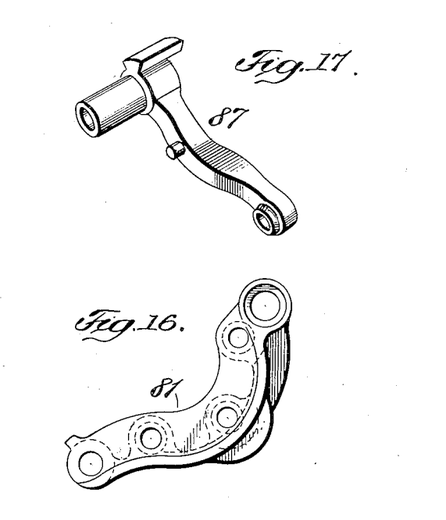
Fig. 17 is a detail view of the link which carries the guard roll for the feeding-off sprocket.

The beater is operated by any suitable means. In the present case the rock shaft which carries the beater is oscillated by means of a cam groove 61 in the face of the balance wheel 62, the rock shaft carrying at its end a rocker arm 63, bearing a cam roll 64, engaging in such cam groove. Figs. 9 and 10 best show this feature.

The take-up device in the present embodiment consists of a continuously rotating sprocket 65 arranged immediately in rear of the beater. By placing this take-up sprocket as close as possible to the beater and without any intervening mechanism, the length of film between the tension device and the take-up device is reduced to a minimum and this reduction in the stretch of film between these two points materially reduces the chance for inaccuracy in feeding of the film.

For the purpose of framing the pictures on the film with respect to the exposure opening, the take-up sprocket is preferably mounted so that it may be adjusted to draw down more film or to release the film. To this end it is here shown as journaled at 66 on the free end of an arm 67 which is pivoted to swing on a supporting hub 68. This arm when once adjusted may be suitably held in such adjusted position, the holding means in this instance taking the form of a clamping screw 69, which may be operated to clamp the split sleeve portions 70 of the sprocket-carrying arm upon the supporting hub.

The gearing for operating the take-up sprocket is arranged to drive the sprocket regardless of its adjusted position, and this is here accomplished by causing the gear 71, carried by the sprocket to mesh with a driving gear 72 concentric with the hub around which the sprocket is adjusted. This driving gear 72 is carried on the inner end of the shaft 73 which extends concentrically through the hub and carries on its outer end the gear 74 which meshes with the pinion 75 on the balance wheel shaft 76. The balance wheel shaft is in turn driven from the main drive gear 77 through the medium of pinion 78 which is in mesh with the drive gear, and gear 79 which moves with pinion 78 and meshes with the pinion 75 on the balance wheel shaft.

The film is held in proper engagement with the take-up sprocket by suitable guide rolls 80, which rolls are preferably mounted on an arm 81 pivoted at 82, so that it may be swung to throw the guide rolls out of the way when first threading the film through the machine. Associated with the take-up device there may be a feeding-off device for advancing the film to the lower reel or film receiver. Such a feeding-off device is here shown in the form of a continuously rotating sprocket 83, operated from the main drive gear by gears 84 and 85. A guard roll 86 may be utilized to hold the film in proper engagement with the feeding-off sprocket and by connecting the link 87, which carries this guard roll, with the pivoted arm 81 carrying the guard rolls of the take-up device, the guard rolls of both take-up and feeding-off devices may be simultaneously thrown to inoperative position.

It will be noticed that the center of pivotal support about which the take-up sprocket swings, is located below the beater at such a point that the shifting of the sprocket toward and away from the beater will be accomplished without substantially varying the angle of the section of film 88, issuing from the beater at any given time in the stroke of the beater. This prevents the adjustment of the take-up from affecting the timing of the beater in any way. This point will be clear from Fig. 1.

A shutter may or may not be used, as found necessary or desirable. In the illustration a shutter of the oscillating type is shown, the same consisting of a blade 89, carried on the end of a pivoted arm 90, which swings upon the center 91. The means for vibrating this arm to carry the shutter past the exposure opening is here a crank disk 92 on the inner end of the balance wheel shaft.

For the purpose of withdrawing the film from the supply reel or other film support a feed sprocket 93 is preferably employed.

To further insure of the absolute and accurate control of the film, it is preferably guided right down to the point where it is acted upon by the beater. This guiding is accomplished in the present instance by extending the lowermost of the clamping shoes down to a point substantially in line with the beater, as indicated in Fig. 1.

While I have, for illustrative purposes, shown and described my invention as a projector for exhibiting pictures, I would have it understood that the invention as a whole or the various features thereof may equally as well be applied to a camera for taking the pictures, and the claims will be construed accordingly.

The construction of the fireshield and the arrangement thereof relative to other parts is not claimed herein but is claimed in my copending application filed January 3, 1916, Ser. No. 69,731.

The construction relating to the hinged door and casing, shown more particularly in Fig. 2, is claimed in my copending application filed January 3, 1916, Ser. No. 69,732.

What is claimed, is:

1. The combination in a moving picture machine provided with an exposure opening, of a take-up device for taking up an equal amount of film once to each cycle of the machine, a tension device exerting a substantially uniform tension on the film and guiding the film in a predetermined path, and a beater movable in a substantial continuation of said predetermined path, said beater acting upon the film to intermittently advance the same in said continuation of the path in which the film is guided by the tension device, whereby to maintain the uniformity of the tension exerted by the tension device.

2. The combination in a moving picture machine provided with an exposure opening, of a retarding device exerting a substantially uniform tension on the film, arranged to guide the film in a substantially straight path past the exposure opening, and a beater, movable to and fro in a substantially straight path, said beater acting on the film to intermittently advance the same in said substantially straight path from the point where it issues from the retarding device, and in substantial alinement with the path of the film past the exposure opening whereby to maintain the uniformity of tension exerted upon the film by the retarding device.

3. The combination in a moving picture machine provided with an exposure opening, of a take-up device for taking up an equal amount of film once to each cycle of the machine, a retarding device exerting a substantially uniform tension on the film, and a beater movable to and fro and acting upon the film to intermittently advance the same past the exposure opening, the said beater having a bodily movement in the direction of movement of the film past the exposure opening so as to present no additional sliding resistance to the passage of the film.

4. The combination in a moving picture machine provided with an exposure opening, of a take-up device for taking up an equal amount of film once to each cycle of the machine, a retarding device exerting a substantially uniform tension on the film, and a beater movable to and fro and acting upon the film to intermittently advance the same past the exposure opening, the said beater having a bodily movement in the direction of movement of the film so as to present no additional sliding resistance to the passage of the film and further arranged to advance the film without substantially deflecting it from the path in which it is guided by the retarding device, whereby the tension exerted upon the film by the retarding device will be maintained substantially uniform irrespective of the action of the beater.

5. The combination in a moving picture machine, of means for guiding the film in a predetermined path, a beater movable in a substantially undeflected path and acting on the film to advance the film on a line forming a substantial continuation of the path in which the film is guided, and means for operating the beater.

6. The combination in a moving picture machine, of means for guiding the film in a substantially straight path, a pivoted beater acting on the film, and having a film engaging part arranged to move in a substantially straight line, said beater arranged to advance the film in a substantially straight line, forming a substantial continuation of the path in which the film is guided, and means for operating the beater.

7. Film advancing mechanism for moving picture machines comprising means for guiding the film in a straight line path, a pivoted beater acting on the film and arranged during a portion of the movement around its pivotal center to exert a pull on the film in a substantially straight line in alinement with the guiding means, and means for operating the beater about its pivotal center.

8. In a moving picture machine, the combination with a film support provided with a plane surface over which the film is guided, of a pivoted beater located to one side of the film support and having a part adapted to move substantially in a plane and to engage the film issuing from said support, the said beater arranged to exert a pull on the film substantially in continuance of the plane of the support, and means for operating the beater.

9. Film advancing mechanism for moving picture machines comprising a beater arm extending forwardly from a given center, a pivotal support for the beater arm eccentrically disposed with respect to the said center, and means for rocking the beater arm upon the pivotal support.

10. The combination in a moving picture machine provided with an exposure opening, of means for guiding the film in a predetermined path past the exposure opening, and means for intermittently advancing the film in a line forming a substantial continuation of the path in which the film is guided, comprising a beater extending from a given center forwardly toward the path of the film, a pivotal support for the beater offset eccentrically with respect to the center aforesaid, and means for oscillating the beater about the center of pivotal support.

11. Film advancing mechanism for moving picture machines comprising an upper member extending forwardly from a given center, a lower member spaced from the upper member and extending rearwardly from the given center, a pivotal support for said members offset eccentrically with respect to the center aforesaid, and means for rocking the members about the pivotal support.

12. In a moving picture machine, the combination with means for guiding the film in a predetermined path, of means for intermittently advancing the film in substantially a continuation of the same path, comprising a beater pivoted at one end and having its free end curved to exert a substantially straight pull on the film during a portion of the movement of the beater, and means for oscillating the beater about its pivotal center.

13. In a moving picture machine, the combination with means for guiding the film in a predetermined path, of means for intermittently advancing the film in a substantial continuation of the same path, comprising a beater extending forwardly from a given center and terminating in a film engaging portion curved to exert a straight pull on the film during a portion of the movement of the beater, a pivot supporting the beater and offset eccentrically with respect to the center aforesaid, and means for oscillating the beater about its pivotal center.

14. Film advancing means for moving picture machines comprising a rock shaft, a supporting member carried at one end of the rock-shaft and eccentrically disposed with respect to the same, a film-engaging plate secured to the supporting member, and means for oscillating the rock shaft.

15. Film advancing means for moving picture machines comprising a rock shaft, a pair of spaced supporting members eccentrically carried at one end of the rock shaft, a film engaging plate secured to one of the supporting members and extending forwardly from the same, a film-engaging plate secured to the other supporting member and extending rearwardly from the same, and means for oscillating the rock shaft.

16. Film advancing means for moving picture machines comprising a pivoted support, a forwardly-extending film-engaging plate carried by the pivoted support, a fulcrum carried by the pivoted support and located in rear of and below the film-engaging plate so as to support the film while it is being acted upon by the film-engaging plate, and means for oscillating the pivoted support, the fulcrum being mounted eccentrically upon the pivoted support so as to move during the active portion of the stroke in the direction of movement of the film.

17. Film advancing means for moving picture machines comprising a pivoted support, means for oscillating the pivoted support, a film-engaging plate carried by the pivoted support constructed and arranged during a portion of its stroke to advance the film in a relatively straight path, and a fulcrum carried by the pivoted support, arranged to support the film while it is being acted upon by the film-engaging plate and having during the active stroke of the film-engaging plate, a bodily movement in the direction of movement of the film.

18. The combination in a moving picture machine provided with an exposure opening, of a take-up device, means for guiding the film with relation to the take-up device, a beater interposed between the exposure opening and the take-up device for intermittently advancing the film past the exposure opening, and means for bodily shifting the take-up device and the guiding means to adjust the film with respect to the exposure opening.

19. The combination with a moving picture machine provided with an exposure opening, of a beater for intermittently advancing the film past the exposure opening, a combined guide and take-up over which the film passes after leaving the beater, and means for shifting the combined guide and take-up with respect to the beater to adjust the film with relation to the exposure opening.

20. The combination in a moving picture machine provided with an exposure opening, of means for guiding the film past the exposure opening, a take-up device spaced from the guiding means aforesaid, means for guiding the film with relation to the take-up device, a beater arranged to act on the stretch of film between the guiding means and the take-up device and the coöperating guiding means, and means for bodily shifting the take-up device with respect to the beater to adjust the film with relation to the exposure opening.

21. In a moving picture machine, the combination with a film support provided with an exposure opening, a take-up sprocket at the lower end of the film support, means for guiding the film with relation to the take-up sprocket, a beater engaging the stretch of film between the take-up sprocket and the lower end of the film support, and means for bodily shifting the take-up sprocket and the guiding means toward and away from the beater.

22. The combination in a moving picture machine provided with an exposure opening, and means for guiding the film past the exposure opening, of a beater located below said guiding means and arranged to engage the film after it leaves the guiding means, a take-up sprocket located in rear of the beater, arranged to take up and hold the film advanced by said beater, and means for bodily shifting the take-up sprocket with relation to the beater without substantially varying the angle of the film at any definite point in the cycle of the machine, extending from the beater to the take-up sprocket.

23. The combination in a moving picture machine provided with an exposure opening, of means for intermittently advancing the film past the exposure opening, a take-up sprocket arranged to take up the film advanced by the intermittent film advancing means, means for guiding the film with relation to the take-up sprocket, and means for bodily shifting the take-up sprocket and the guiding means with respect to the intermittent film advancing means.

24. The combination in a moving picture machine, of film advancing means, a pivoted arm, a take-up sprocket mounted on said arm, means for guiding the film with relation to the sprocket also mounted on said arm, means for adjusting the arm upon its pivot to shift the take-up sprocket and the guiding means with respect to the film advancing means, and means for rotating the take-up sprocket irrespective of its adjusted position.

25. The combination in a moving picture machine, of means for intermittently advancing the film, a film feeding roll adjacent the intermittent film advancing means, means for guiding the film with relation to the roll, and means for bodily shifting the film feeding roll and the guiding means with respect to the intermittent film advancing means.

26. In a moving picture machine, the combination with a film support provided with an exposure opening therein, a beater located below the film support for intermittently advancing the film past the exposure opening, a film feeding roll located in rear of the beater, means for guiding the film with relation to the roll, an adjustable arm on which the film feeding roll and the guiding means are mounted, and means for shifting the said arm to carry the film engaged by the roll toward or away from the beater.

27. The combination in a moving picture machine provided with an exposure opening, of a beater located below the exposure opening, a combined framing and take-up sprocket, a pivoted arm on which the said sprocket is mounted, means for shifting said sprocket arm to adjust the sprocket with relation to the beater, means for rotating the sprocket irrespective of its adjusted position, and releasable means also carried on the pivoted arm for holding the film in engagement with the sprocket.

28. The combination in a moving picture machine, of a pivoted arm, a driving gear concentric with the pivot on which said arm is mounted, a film-engaging sprocket carried on the free end of the arm, a gear carried by the sprocket engaging at all times with the driving gear aforesaid, means for guiding the film with relation to the sprocket also carried by the arm, and means for securing the pivoted arm in adjusted position.

29. The combination in a moving picture machine, of a supporting frame provided with a hub, an arm pivotally engaged on said hub, a driving gear concentric with the hub, a film engaging sprocket mounted on the free end of the adjustable arm, a gear carried by said sprocket in engagement with the driving gear, means for guiding the film with relation to the sprocket also mounted on the arm and means for securing the arm in adjusted position upon the hub.

30. The combination in a moving picture machine, of a supporting frame provided with a hub, an arm having a split portion pivotally engaged upon the hub, a driving gear concentric with the hub, a film-engaging sprocket mounted on the free end of the arm, a gear carried by said sprocket engaging the driving gear aforesaid, and a clamping screw engaging the split portions of the arm for clamping the same in adjusted position upon the hub.

31. The combination in a moving picture machine, of a film support over which the film is guided, a beater below the film support, and a guide arranged to engage the outer face of the film and extending from the lower edge of the film support to a point substantially in line with the beater.

32. The combination in a moving picture machine, of a film support over which the film is guided, a beater below the film support, and clamping shoes bearing upon the film passing across the face of the film support, the said clamping shoes projecting downwardly from the lower edge of the film support to a point substantially in line with the beater.

33. The combination in a moving picture machine, of a film support over which the film is guided in a substantially straight path, a dependent guide overhanging the lower edge of the film support for directing the film downward in a substantial continuation of the path in which the film is guided, a beater below the film support arranged to advance the film in a line forming a substantial continuation of the path in which the film is guided, and means for operating the beater.

Signed at New York city, in the county of New York, and State of New York, this 17th day of September, A. D. 1912.

JAMES A. CAMERON.

Witnesses:
Louisa E. Simson,
Axel V. Beeker.